No. 790,871. Patented May 23, 1905.

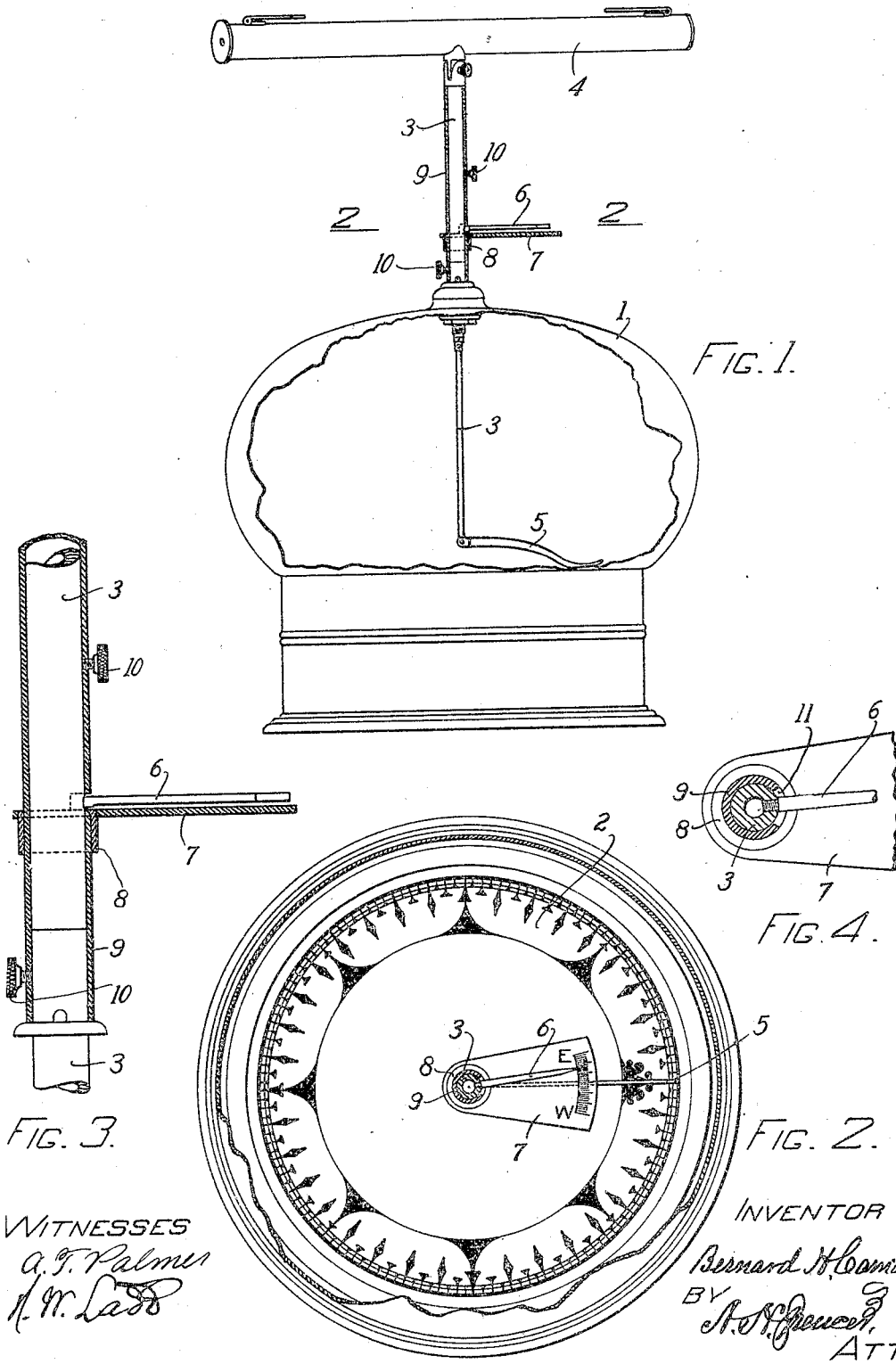

UNITED STATES PATENT OFFICE.

BERNARD H. CAMDEN, OF THE UNITED STATES REVENUE SERVICE, ASSIGNOR, BY DIRECT AND MESNE ASSIGNMENTS, OF SEVEN-EIGHTHS TO HARRY PEYTON ARBECAM, OF BOSTON, MASSACHUSETTS, AND ONE-EIGHTH TO EDITH S. HOLDEN, OF BOSTON, MASSACHUSETTS.

COMPASS-DEVIATION CORRECTOR.

SPECIFICATION forming part of Letters Patent No. 790,871, dated May 23, 1905.

Application filed June 11, 1904. Serial No. 212,071.

*To all whom it may concern:*

Be it known that I, BERNARD H. CAMDEN, of the United States Steamship *Seminole*, in the United States Revenue Service, have invented certain new and useful Improvements in Compass-Deviation Correctors, of which the following is a specification.

It is well known to mariners that the magnetic needle at times deviates slightly from the true meridian, (to a greater or less extent under different circumstances,) and it has heretofore been necessary after taking observations by compass to correct the same by a mathematical calculation, making allowance for the known deviation.

The object of my invention is to provide a simple device applicable to a ship's binnacle for correcting the deviation of the compass, so as to show at a glance and without a scientific computation the true magnetic bearing of objects within the range of vision.

In the drawings, Figure 1 is an elevation, partly in section, of a binnacle furnished with a sighting-tube and alidade and having my improvement applied to the vertical shaft or stem. Fig. 2 is a top plan showing my device and the compass-dial on a larger scale, the shaft or stem in section on line 2 2 of Fig. 1. Figs. 3 and 4 are enlarged sectional details illustrating my improvement.

The binnacle 1 and compass-dial 2 will be of suitable form. A vertical shaft 3, mounted for rotation in the binnacle-top, carries at its upper end a sighting-tube 4 and at its foot a radial indicator 5, the tip of which rests lightly on the dial. Tube 4 and indicator 5 are pivoted to shaft 3 and extend normally in the same vertical plane, so that the indicator shows on the compass-dial 2 the precise point of the compass on which the sighting-tube bears, as in the well-known Arbecam alidade. To a structure of this general character I apply my deviation-corrector, in which 6 represents a radial pointer screwed into or otherwise firmly secured to the upper section of shaft 3, and 7 is a flat horizontal sector-plate immediately below pointer 6 and formed with a depending circular flange 8, by which said plate is secured to a sleeve 9, surrounding the shaft, and held adjustably thereon by set-screws 10. The sector-plate has near its outer end a short arc graduated in degrees or points and fractions thereof, as at "E. W.," Fig. 2.

Within sleeve 9 the vertical shaft is in two separate sections one above the other, the sleeve and its set-screws serving to couple them together. Said sleeve has a recess or transverse slot 11 formed through it just above the sector-plate 7 to permit insertion of the threaded end of pointer 6 into shaft 3 and allow the pointer a limited lateral movement in adjusting it for deviation.

When there is no deviation, the sighting-tube 4, the indicator 5, and the intermediate pointer 6 all radiate in the same vertical plane, the pointer extending over the center of sector-plate 7. In case of deviation, the amount being known, loosen the upper thumb-screw 10 and swing the pointer, and with it the sighting-tube, through the angle equal to the deviation to east or west, as denoted by "E." and "W." on said plate, Fig. 2, then tighten said thumb-screw, and take the bearings as denoted by indicator 5, which will be true magnetic ones.

I claim as my invention—

1. A binnacle, a compass and its dial therein, a rotatable sectional shaft supported vertically by the binnacle and provided, terminally, with a sighting device and radial indicator normally maintained in the same vertical plane, in combination with a horizontal sector-plate graduated terminally and a radial pointer above and adjacent to said plate, at an intermediate point on said shaft, said pointer and sighting device being angularly adjustable with relation to said sector-plate and indicator to an extent equal to the known deviation of the compass, for the purpose set forth.

2. The described compass-deviation corrector, comprising an alidade having a vertical central shaft in two sections respectively carrying a sighting-tube and compass-indicator, normally in the same radial vertical plane, in combination with a radial pointer fixed in the upper section of said shaft and a horizontal sector-plate furnished terminally with a short graduated arc beneath said pointer, and with a sleeve surrounding said shaft, secured to said plate and recessed for relative adjustment of said plate and pointer, substantially as set forth.

In testimony whereof I have affixed my signature in presence of two witnesses.

BERNARD H. CAMDEN.

Witnesses:
A. H. SPENCER,
H. W. LADD.